US008213666B2

(12) United States Patent
Groesch

(10) Patent No.: US 8,213,666 B2
(45) Date of Patent: Jul. 3, 2012

(54) HEADPHONES WITH EMBEDDABLE ACCESSORIES INCLUDING A PERSONAL MEDIA PLAYER

(75) Inventor: Michael R. Groesch, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1042 days.

(21) Appl. No.: 12/147,447

(22) Filed: Jun. 26, 2008

(65) Prior Publication Data

US 2009/0323975 A1 Dec. 31, 2009

(51) Int. Cl.
*H04R 25/00* (2006.01)
*H04R 1/10* (2006.01)
*H04B 1/08* (2006.01)

(52) U.S. Cl. ........... 381/376; 381/74; 381/378; 455/349

(58) Field of Classification Search ................. 381/71.1, 381/367, 370, 376, 74, 87, 333, 334, 335, 381/378; 455/130, 344, 351, 349
See application file for complete search history.

(56) References Cited

U.S. PATENT DOCUMENTS 5,438,698 A * 8/1995 Burton et al. ................. 455/351
6,788,797 B2 * 9/2004 Kim .............................. 381/371
6,888,950 B2 * 5/2005 Siskin et al. .................. 381/378
7,394,912 B2 * 7/2008 Whipple ....................... 381/376
7,571,503 B2 * 8/2009 Gabriel ............................ 5/636
7,668,330 B2 * 2/2010 Siskin et al. .................. 381/334
7,783,065 B2 * 8/2010 Navid ........................... 381/311
7,920,903 B2 * 4/2011 Ueda et al. ................. 455/575.1
8,019,110 B1 * 9/2011 Johnson ........................ 381/376
8,031,878 B2 * 10/2011 Gauger et al. .................. 381/74
8,085,963 B2 * 12/2011 Solland ......................... 381/334
8,107,664 B2 * 1/2012 Mao .............................. 381/376
8,121,329 B2 * 2/2012 Groset et al. .................. 381/333

* cited by examiner

*Primary Examiner* — Anh Mai
*Assistant Examiner* — Joselito Baisa
(74) *Attorney, Agent, or Firm* — Mayer & Williams P.C.

(57) ABSTRACT

A set of headphones is configured with an integrated accessory receiving space and a device connector that interface with a variety of different interchangeable accessories. The accessories can range from a personal media player that can render audio, such as MP3 (Moving Pictures Expert Group, MPEG-1, audio layer 3) content, to rechargeable battery packs, storage devices, and modules that can support wireless communication between the headphones and other devices such as media centers, game consoles, and personal computers ("PCs"). A user can pick an accessory and snap it into the receiving space of the headphones. When so installed, the accessory becomes physically and functionally embedded so that its functionality becomes seamlessly integrated with operation of the headphones.

17 Claims, 10 Drawing Sheets

HEADPHONES WITH EMBEDDABLE ACCESSORIES INCLUDING A PERSONAL MEDIA PLAYER

BACKGROUND

Headphones are very popular devices for privately listening to audio content, such as music or the sound track to video presentations, without disturbing others. The sound quality from headphones can often be excellent. Many headphones provide the frequency response, signal to noise ratio, and total harmonic distortion that compare very favorably to that of conventional free standing audio speakers that cost many times their price This good performance results from the fact that the speakers in the headphones are close to the user's ears and are easier to drive to achieve the same sound pressure levels. In addition, the acoustics of the room do not play a factor in the fidelity of the signal that the headphones render.

Headphone performance is generally optimized when ambient noise from the environment is prevented from entering the user's ears. Over-the-ear headphone designs which cover the ear completely to form a tight seal are generally very good at sound isolation. On-ear headphone designs, which are typically more compact, can also perform reasonably well in preventing outside noise from reducing the quality of the listening experience. The smaller and lightweight ear buds and other in-ear designs generally do not provide good isolation unless some sort of sleeve or other sealing method is used which some users find uncomfortable.

While larger than ear buds or other in-ear designs, many users still prefer traditional over-the-ear headphones due to their comfort, noise isolation and sound quality. These qualities suit a wide range of users from video game players, to music aficionados, to travelers. While current designs can perform satisfactorily, more flexibility and features when listening to audio content would still be desirable.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A set of headphones is configured with an integrated accessory receiving space and a device connector that interface with a variety of different interchangeable accessories. The accessories can range from a personal media player that can render audio, such as MP3 (Moving Pictures Expert Group, MPEG-1, audio layer 3) content, to rechargeable battery packs, storage devices, and modules that can support wireless communication between the headphones and other devices such as media centers, game consoles, and personal computers ("PCs"). A user can pick an accessory and snap it into the receiving space of the headphones. When so installed, the accessory becomes physically and functionally embedded so that its functionality becomes seamlessly integrated with operation of the headphones.

In various illustrative examples, each headphone speaker enclosure has an integrated accessory receiving space so that accessories may be mixed and matched in pairs. The headphones may also connect to other devices using a wired connection protocol such as USB (Universal Serial Bus). User controls on the headphones may be used to operate the embedded accessories, or supplement the controls that are built in to the accessory. Optional features such as a detachable boom microphone and active noise cancellation may also be implemented in the headphones.

In the case of the personal media player accessory, the headphones may also operate as a docking device to enable the player to be synchronized with a host PC device with a USB cable, or using a wireless connection provided by a second embedded accessory. Media content and other data may then be exchanged between the media player and the host PC, for example, to download new content onto the player, or keep data current.

Advantageously, the present headphones provide a flexible configuration that enables users to easily tailor the headphones to their particular needs. The embedded accessories support additional functionality in a streamlined form factor and let the user enjoy music, listen to an audio soundtrack when watching a movie, and participate in video games, for example, without the hassle and clutter of wires.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Elements are not drawn to scale unless otherwise indicated.

DETAILED DESCRIPTION

Figure 1:
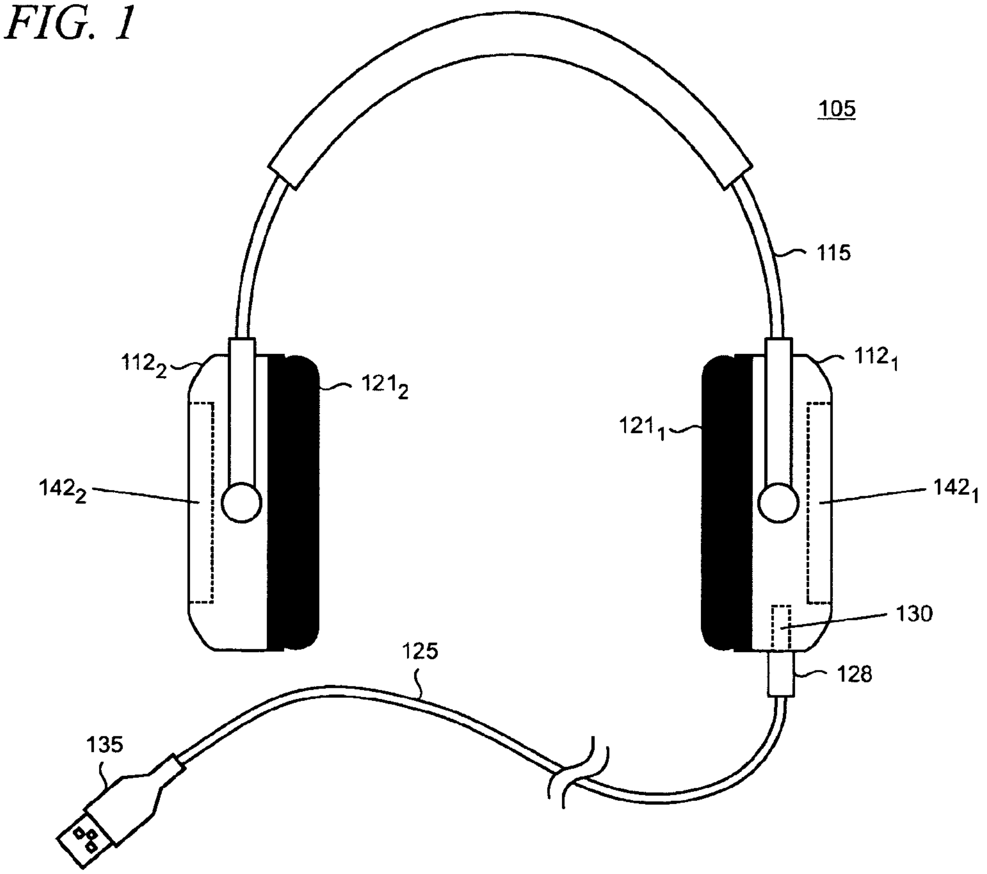
FIG. 1 shows a set of illustrative headphones having speaker enclosures that are each configured to accept a variety of different embedded accessories.

FIG. 1 shows a set of illustrative headphones 105 having speaker enclosures $\mathbf{112}_1$ and $\mathbf{112}_2$ that are each configured to accept a variety of different embedded accessories. The speaker enclosures 112 each contain a speaker (i.e., audio transducer) that is used to render an audio signal. Generally, the audio signal is encoded as a stereophonic signal so that when rendered by the speakers will produce a stereo effect for the user. Accordingly, the earphone enclosures 112 are each typically identified as being intended for the right or left ear of the user.

The speaker enclosures 112 are connected to a headband 115 that is typically padded for comfort and adjustable to fit different users. On the inside facing portions of the speaker enclosures 112, padded ear cups $\mathbf{12}_1$ land $\mathbf{121}_2$ are positioned to rest against the side of the head and encapsulate the user's ears. In this example, the headphones 105 are over-the-ear style headphones. However, in the alternative implementations, on-ear style headphones may also be used.

A detachable communications cable 125 is used to connect the headphones 105 to other devices such as PCs, media centers, stereo systems, and the like. In this example, the communications cable 125 is arranged as a USB cable which supports both communication and the transmission of power from a powered USB port in the other device. However, other cable types supporting various different communication protocols may also be used depending upon the requirements of a particular implementation.

The proximal end of the communications cable 125 includes a male device connector 128 that mateably engages with a corresponding female connector 130 that is located in one of the speaker enclosures 112. The distal end of the communications cable 125 includes a male connector 135 that is arranged for mateable engagement with a corresponding USB port that is located in the other device (e.g., the PC, media system, stereo, etc.). In some cases, an adapter (not shown) may be used to adapt the USB connector to a standard audio plug such as a ¼ inch stereo plug or mini-plug, or to a twin prong plug that is often used with onboard sound systems in airplanes.

Figure 2:
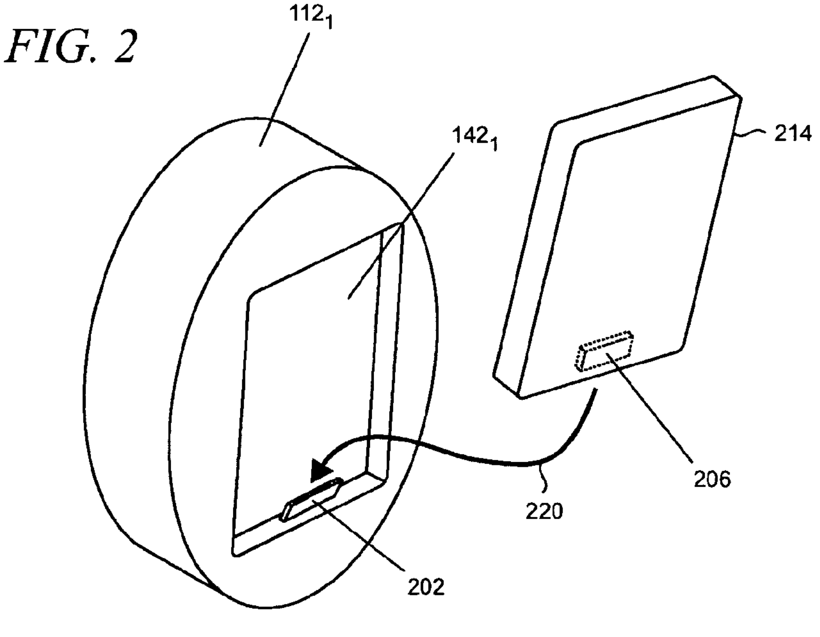
FIG. 2 is an enlarged pictorial view showing an accessory device connector that is located on the bottom of surface of an accessory receiving space in the speaker enclosure.

Each speaker enclosure 112 is configured with a recessed accessory receiving space $\mathbf{142}_1$ and $\mathbf{142}_2$ that are used to hold and engage with various different types of embeddable accessories on an interchangeable basis. As shown in FIG. 2, the speaker enclosure (as representatively illustrated by enclosure $\mathbf{112}_1$) has a male device connector 202 that is located in the bottom portion of the accessory receiving space $\mathbf{142}_1$ that is configured for mateable engagement with a corresponding female docking connector 206 that is accessed through an opening on the bottom surface of the embeddable accessory 214. The accessory receiving space $\mathbf{142}_1$, embeddable accessory 214, and the connectors 202 and 206 are configured so that the user may guide the accessory in to the receiving space and engage the connectors, as indicated by the arrow 220. In this example, the connectors 202 and 206 are proprietary, device-specific connectors. However, in alternative arrangements, standardized connector types may also be used.

Figure 3:
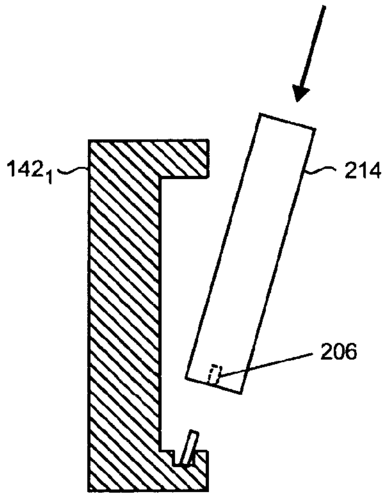
FIGS. 3, 4, and 5 show an illustrative sequence in which an accessory is removably engagable with an accessory receiving space in the speaker enclosure.
Figure 4:
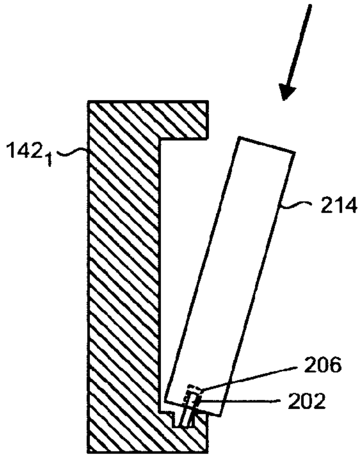
Figure 5:
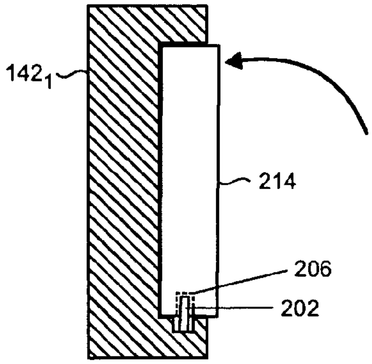

As shown in the sequence of illustrations in FIGS. 3, 4, and 5, the device connector 202 is configured to be slightly rotatably moveable about an axis that is parallel to its long side. Such rotation enables the user to position the bottom of the accessory 214 into the bottom of the receiving space $\mathbf{142}_1$, engage the connectors, and the rotate the top of the accessory until it is fully inserted within the recess.

Typically, the receiving space $\mathbf{142}_1$ and the embeddable accessory 214 will be configured so that the accessory is positively retained once inserted. The retention mechanisms utilized can vary by implementation. In some cases, a friction fit can be implemented. In other cases, other types of conventional mechanisms can be used such as those that can provide tactile feedback to the user that the accessory 214 is fully engaged and locked into position. For example, a snap fit arrangement may be used where an audible click and tactile sensation indicates to the user that the accessory 214 has been fully physically embedded in the headphones 105 and is ready for use. The retention mechanism can be implemented in the receiving space $\mathbf{142}_1$, in an accessory, or be distributed between the receiving space and accessory in some cases.

Figure 6:
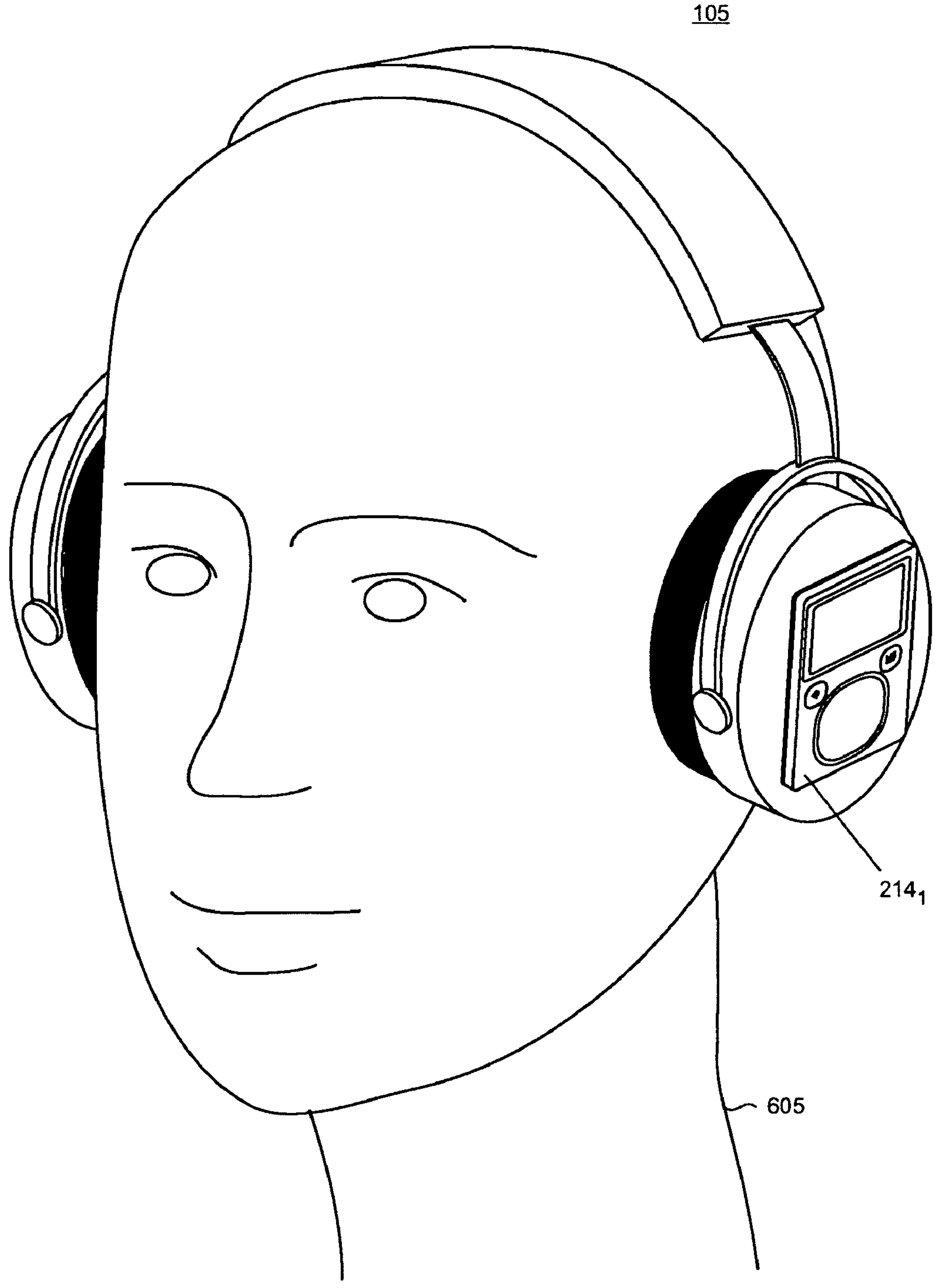
FIG. 6 shows the present headphones in which a personal media player is configured as an embedded accessory.

FIG. 6 shows one illustrative example of an accessory $\mathbf{214}_1$ that is embedded in the headphones 105 worn by a user 605. The accessory $\mathbf{214}_1$ is a personal media player that is configured to render media content such as audio, images, and video that the player has stored or which it can access. When the personal media player $\mathbf{214}_1$ is embedded, audio content from the player may be rendered by the headphones 105. This arrangement provides a neat and convenient package for the user 605 because wires that are normally utilized to connect the personal media player to the headphones are not necessary.

Figure 7:
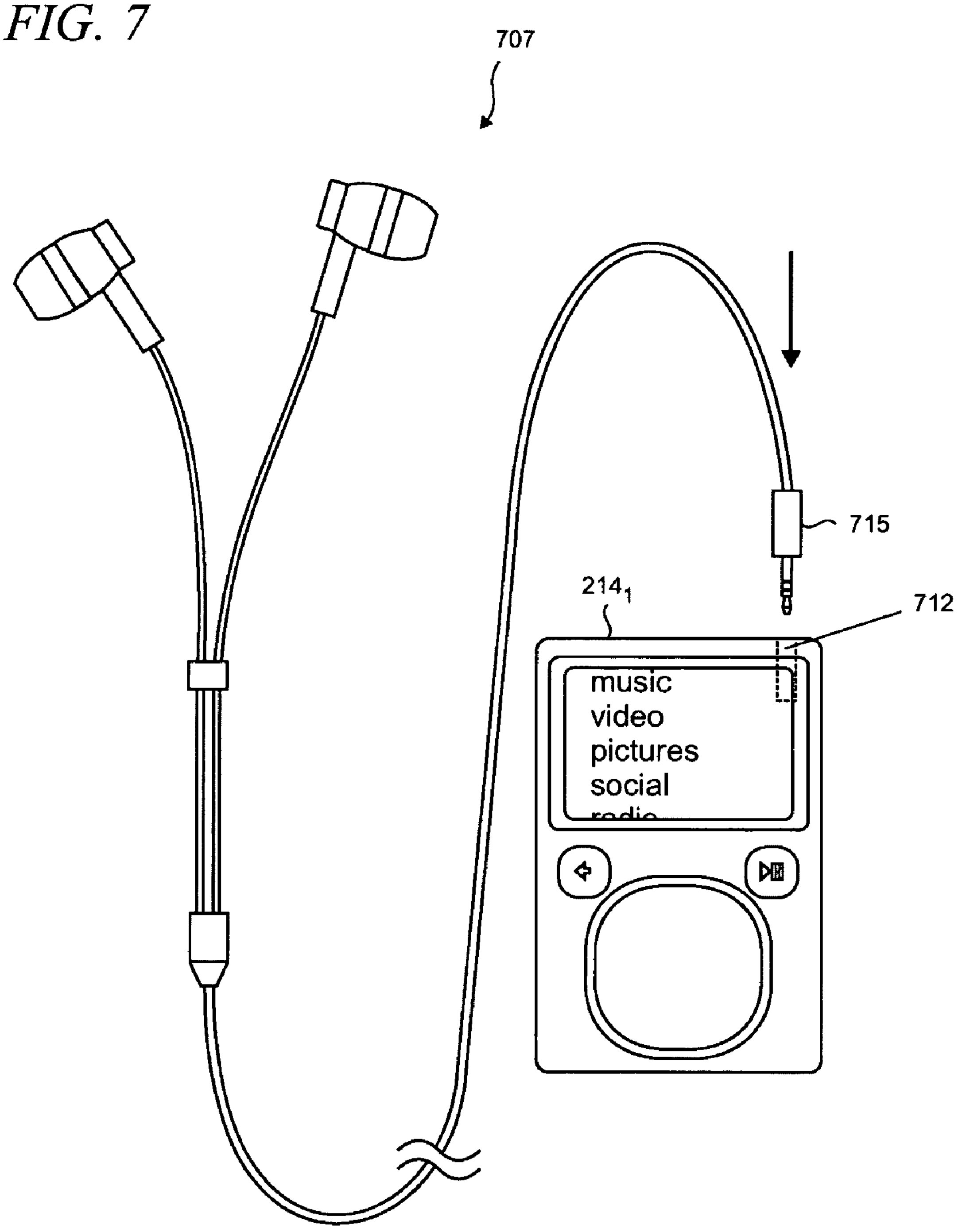
FIG. 7 shows a set of earphones that may be used with the personal media player when it is used as a standalone device.

As shown in FIG. 7, the personal media player $\mathbf{214}_1$ is also configured to operate in a standalone mode separate from the headphones 105 when not embedded. In this mode, the personal media player $\mathbf{214}_1$ may be operated in a usual manner as a battery-powered device and used with conventional earphones 707. Here, the earphones interface with an audio output jack 712 through a stereo mini-plug 715.

Figure 8:
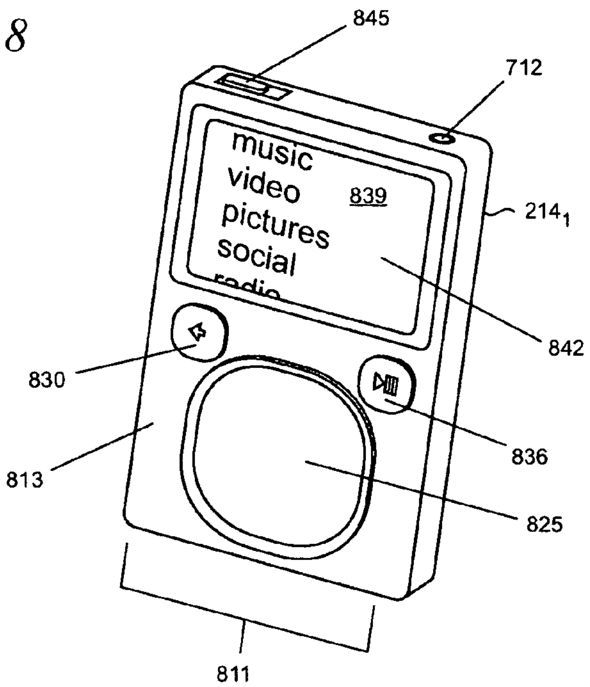
FIGS. 8 and 9 show additional functionality supported by the personal media player.

The personal media player $\mathbf{214}_1$ includes user controls 811 on the front surface of the body 813 of the player, as shown in FIG. 8, The user controls 811, in this example, include a gesture pad 825, called a G-Pad, which combines the functionality of a conventional directional pad (i.e., a "D-pad") with a touch sensitive surface as described in U.S. patent application Ser. No. 60/987,399, filed Nov. 12, 2007, entitled "User Interface with Physics Engine for Natural Gestural Control," owned by the assignee of the present application and hereby incorporated by reference in its entirety having the same effect as if set forth in length. A "back" button 830 and "play/pause" button 836 are also provided. However, other types of user controls may also be used depending on the requirements of a particular implementation.

The personal media player $\mathbf{214}_1$ also supports a graphical user interface ("GUI") 839 that is rendered on a display screen 842. The GUI 839 uses menus, icons, and the like to enable the user 605 to find, select, and control playback of media content that is available to the player $\mathbf{214}_1$. In addition to supporting the GUI 839, the display screen 842 is also used to render video content. The personal media player $\mathbf{214}_1$ is further configured with common features such as a lock switch 845 that, when activated, locks out the user controls 811 so that stray button pushes or touches are ignored by the player $\mathbf{214}_1$.

Figure 9:
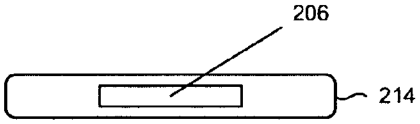
Figure 10:
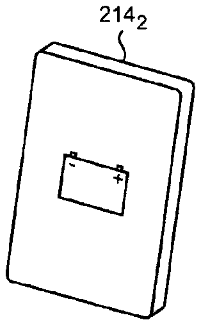
FIGS. 10, 11, 12, and 13 show various illustrative accessories that may be alternatively embedded in the headphones.
Figure 11:
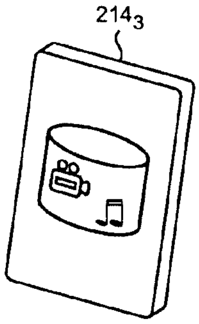
Figure 12:
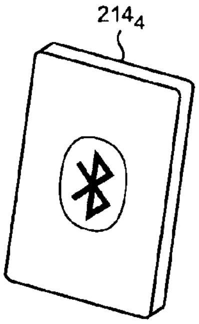
Figure 13:

As noted above and shown in FIG. 9, the embeddable accessory devices 214 include a female docking connector 206 that is accessed through a slot in the bottom of the accessory. In the case of the personal media player $\mathbf{214}_1$, the docking connector 206 also serves as a synchronization port to enable the player to connect to devices such as a PC to synchronize content and data, as well as connect to an AC power adapter to charge the player's on-board battery. In addition, the player $\mathbf{214}_1$ may be equipped with wireless networking capability to perform such synchronization wirelessly as well as to communicate with other devices using a peer to peer networking arrangement.

FIGS. 10-13 show additional illustrative examples of embeddable accessories respectively indicated by reference numerals $\mathbf{214}_{2 \ldots N}$. As shown, the embeddable accessories 112 are configured with substantially similar form factors to enable the accessories to fit within the receiving space of the headphone enclosure 112 in the same way. That is, each accessory $\mathbf{214}_{2 \ldots N}$ has a body with a similar overall size and shape as the personal media player $\mathbf{214}_1$ and may thus be interchangeable within the space 142.

The accessories 214 are marked with graphical icons to indicate their function in this example. In alternative arrangements text, color coding, or other markings may be used to differentiate the function of the accessories to the user.

Embeddable accessory $\mathbf{214}_2$ is a rechargeable battery pack that may be utilized in several ways. In a usage scenario in which the headphones 105 are used alone (i.e., with only the battery pack $\mathbf{214}_2$ and without another embeddable accessory such as the personal media player $\mathbf{214}_1$), the battery pack can be used to power an amplifier, digital signal processor, or active noise cancellation circuit that may be implemented in the headphones. For example, the user 605 may wish to use the headphones 105 to plug in and listen to the onboard entertainment system while on an airplane trip. For the purposes of the discussion below, such functionality of the headphones without an embedded accessory is termed "native" functionality. Embedded accessories provide "enhanced" functionality.

It is further emphasized that the headphones 105 may also employ an internally disposed rechargeable battery or use traditional replaceable (i.e., disposable) batteries. That is, even in cases where the battery pack $\mathbf{214}_1$ is not used (for example, because both accessory receiving spaces are being used to embed other accessories or the user chooses not to use any accessories at all), the headphones 105 will still have power to operate to provide native functionality. In addition, the headphones 105 do not necessarily need to include actively powered components. In some implementations, the headphones 105 will be configured to render an audio signal that is provided from an embedded accessory or from an external source (e.g., one that is accessed via the communications cable 125) without any amplification, signal processing, or active noise reduction.

In other usage scenarios where an embedded accessory is used (i.e., where the accessory is embedded in one speaker enclosure 112, and the battery pack $\mathbf{214}_2$ is embedded in the other), the battery pack may be used as a source of power for that accessory. For example, while the personal media player $\mathbf{214}_1$ has a built-in rechargeable battery, due to the relatively small size of the player, the battery typically has limited capacity. Accordingly, the battery pack $\mathbf{214}_2$ (which is the approximately the same size as the player itself) can be expected to substantially increase the run time of the player $\mathbf{214}_1$ when it is embedded in the headphones 105.

The battery pack $\mathbf{214}_1$ will typically be arranged to be recharged using an external AC power adapter (not shown). Alternatively, the battery pack $\mathbf{214}_1$ can be recharged when embedded in the headphones 105 when the headphones are connected to a powered USB port via the cable 125 (FIG. 1).

Embeddable accessory $\mathbf{214}_3$ is mass storage device ("MSD") or memory card device that is typically implemented using non-volatile memory such as Flash memory (i.e., EEPROM, electrically erasable read only memory). MSD $\mathbf{214}_3$ is typically utilized to hold additional media content that may be accessed and then rendered by the personal media player $\mathbf{214}_1$ when both the player and the MSD are embedded in the headphones 105. Media content may be written the MSD $\mathbf{214}_3$ using an external writer (not shown) that may be coupled to a PC. Thus, for example, a user may transfer media content such as a playlist of MP3 formatted songs from a library on his PC to the MSD $\mathbf{214}_3$ which can then be used to supplement the content that is stored on the personal media player $\mathbf{214}_1$.

Alternatively, in some scenarios media content may be pre-written to the MSD 2143 and sold at retail like traditional physically embodied media such as optical media including CDs (compact discs) and DVDs (digital versatile discs). In some cases the pre-written media content can be organized like traditional albums, special editions, compilations, or box sets in a manner that parallels the organization of traditional physical media. In other cases, the pre-written media content can be produced to order. For example, a consumer may make selections of media content for purchase on an MSD $\mathbf{214}_3$, for example, on-line using an e-commerce portal such as a web site, via phone, or at a retail store or self-serve kiosk. The delivered MSD $\mathbf{214}_3$ can then be embedded (along with the personal media player $\mathbf{214}_1$) and the content rendered using the headphones 105.

Media content on the MSD $\mathbf{214}_3$ may be encoded in one of various conventional formats, or in some implementations it may be encoded in a proprietary format. The media content may also be protected using various DRM schemes, or be included on the MSD $\mathbf{214}_3$ in the clear without any applicable protection or usage restrictions.

Embeddable accessory $\mathbf{214}_4$ is wireless communications module that enables short range RF (radio frequency) communication using the Bluetooth® protocol. When the Bluetooth module $\mathbf{214}_4$ is embedded, wireless communications between the headphones 105 and other Bluetooth-compatible devices may be implemented. For example, games consoles, televisions, and entertainment systems often are equipped with Bluetooth transceivers to effectuate communications with wireless headsets and headphones.

Embeddable accessory $\mathbf{214}_N$ is also a wireless communication module, but here using the Wi-Fi® protocol under the IEEE (Institute of Electrical and Electronics Engineers) 802.11 communications standards. WiFi typically enables greater range compared to Bluetooth and is commonly utilized in wireless computers networks in both home and commercial environments. Usage scenarios here are similar to those supported by the Bluetooth module $\mathbf{214}_4$ and include RF communication between devices such as PCs and stereo systems and the headphones 105.

Figure 14:
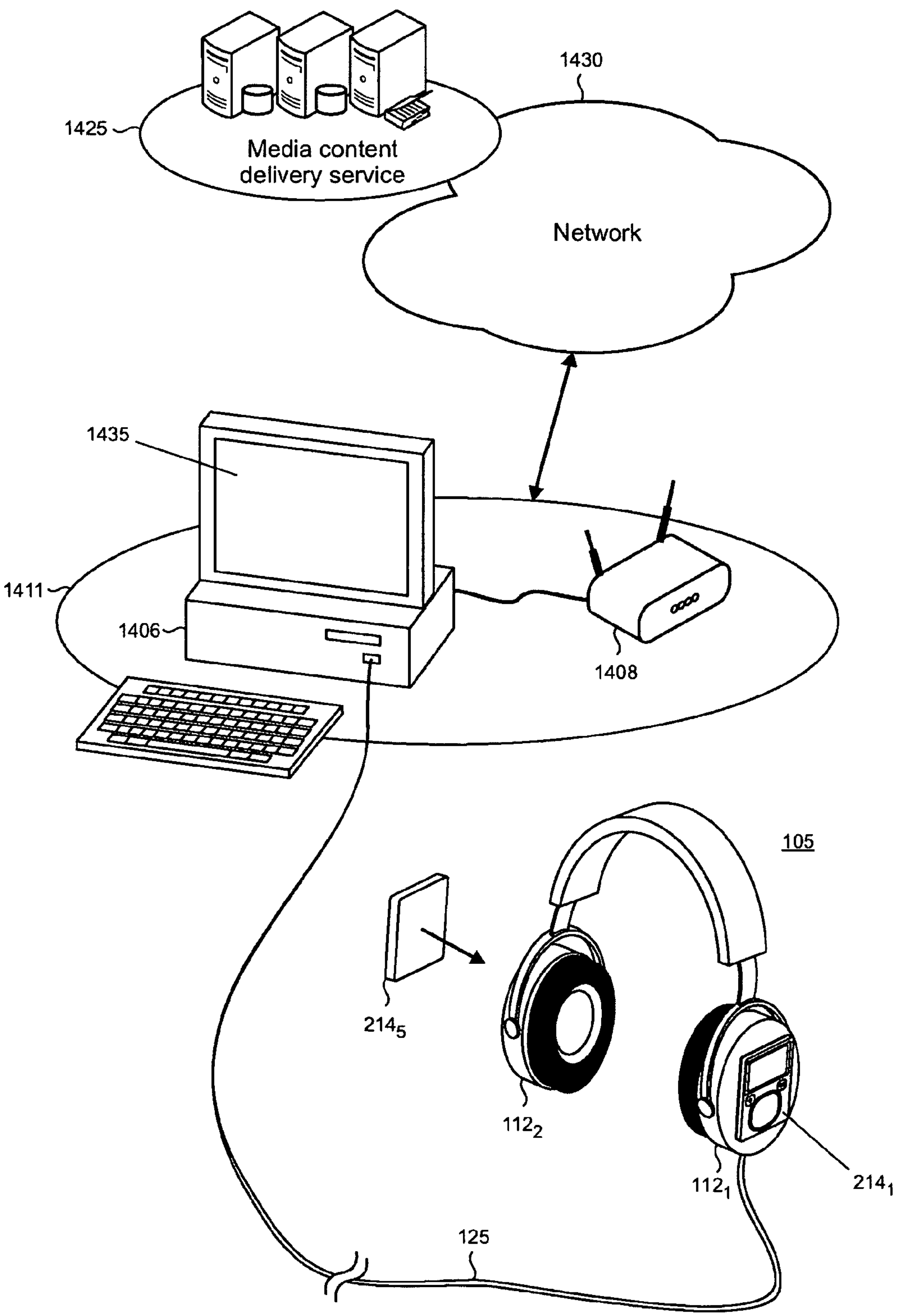
FIG. 14 shows an illustrative arrangement for synchronizing data between a PC and the personal media player, where the PC is connected to an on-line media content delivery service.

The Wi-Fi module $\mathbf{214}_N$ enables other usage scenarios as well. For example, as shown in FIG. 14, embedding a Wi-Fi module $\mathbf{214}_N$ in one speaker enclosure 112 and embedding the personal media player $\mathbf{214}_1$ in the other enables the player to synchronize with a PC 1406. The Wi-Fi module $\mathbf{214}_N$ will typically work through a wireless access point 1408 that is used in a local area network ("LAN") 1411 or other home networking infrastructure. The synchronization process implemented between the PC 1406 and personal media player $\mathbf{214}_1$ typically enables media content such as music, video, images, games, information, and other data to be downloaded from an on-line source or media content delivery service 1425 over a network 1430 such as the Internet to the PC 1406. In this way, the PC 1406 operates as an intermediary or proxy device between the service 1425 and the personal media player $\mathbf{214}_1$.

In addition to implementing synchronization wirelessly as described above, a communication between the headphones 105 and the PC 1406 may also be implemented using a wired connection with the cable 125. In this way, the headphones 105 function as a traditional docking station for the personal media player $\mathbf{214}_1$.

Another usage scenario supported by the combination of Wi-Fi module $\mathbf{214}_N$ and personal media player $\mathbf{214}_1$ as embedded accessories in the headphones 105 provides for media content that is stored on the player (or an embedded MSD $214_3$) to be streamed to the PC and rendered there. In this example, video content may be viewed on the PC's screen 1435 while the audio portion of the content is rendered by the headphones 105.

Other embeddable accessories may also be implemented that combine various functionalities. For example, an embeddable accessory may include mass storage functionality as well as rechargeable battery functionality. Another embeddable accessory may combine Bluetooth communications with battery functionality. It is noted that these combinations are illustrative and other combinations may also be used.

Figure 15:
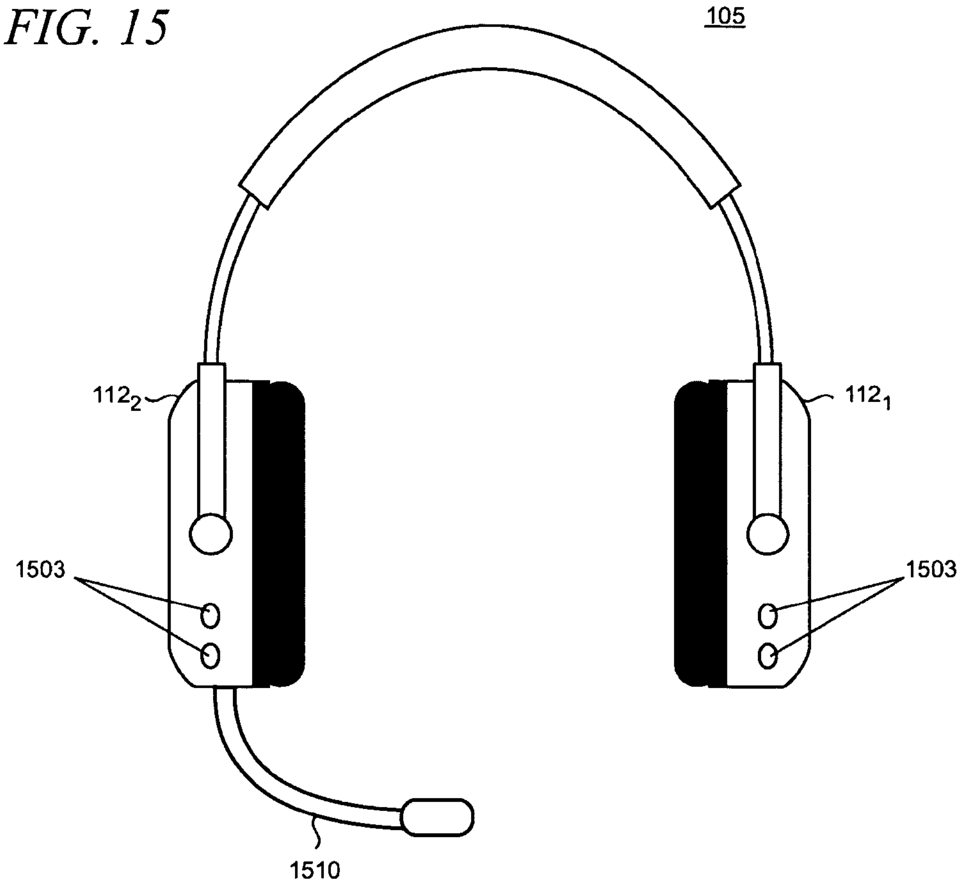
FIGS. 15 and 16 show optionally implemented user controls that are located on the speaker enclosures and an optionally implemented detachable boom microphone.
Figure 16:
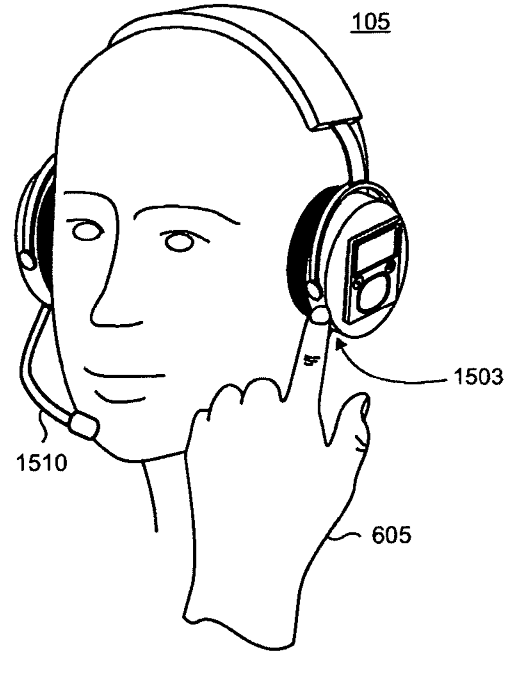

FIGS. 15 and 16 show optionally implemented controls 1503 that are located on the speaker enclosures 112 and an optionally implemented detachable boom microphone 1510. The user controls 1503 are located towards the bottom of the enclosures 112 in this example, but may also be located in other positions as well to suit the particular needs of a given implementation. The user controls 1503 will typically be configured with unique features, such as raised portions, bumps, ridges, indentations, etc., so that each control can be identified by touch. In this way, the user 605 can operate the headphones 105 while they are being worn, as shown in FIG. 16.

Generally, the user controls 1503 will be used to supplement the controls that might be supported by a particular embeddable accessory 214. So, in the case of the personal media player $214_1$, the user controls 1503 on the headphones 105 will typically implement some subset of the control functions that would ordinarily be supported by the user controls 811 on the player. For example, the user controls 1503 might allow simple navigation forwards and backwards in a playlist, or enable volume to be increased or decreased. Generally, the functionality supported by the user controls 1503 will be streamlined and simplified, for example without using branching or nested menu structures, to avoid causing confusion for the user 605 who does not have the benefit a visual display when using the controls.

In some implementations, actuation of the user controls 1503 may be accompanied by tones or other signals played through the headphones 105 to indicate a particular control action. Thus, for example, a unique tone or series of tones could be played to indicate that the user has reached the end of a playlist.

The boom microphone 1510 is also optionally implemented with a given headphone scenario and may be utilized by a user when desired. For example, the headphones 105 and boom microphone 1510 can be used in multiplayer video game environments where teammates often communicate with each other. Or, such arrangement may be used for telephone communication using Internet-based telephony such as VoIP (Voice over Internet Protocol). In this example, the boom microphone is adjustable and may also be detached from a port (not shown) on the bottom of a speaker enclosure 112 when not being used.

Figure 17:
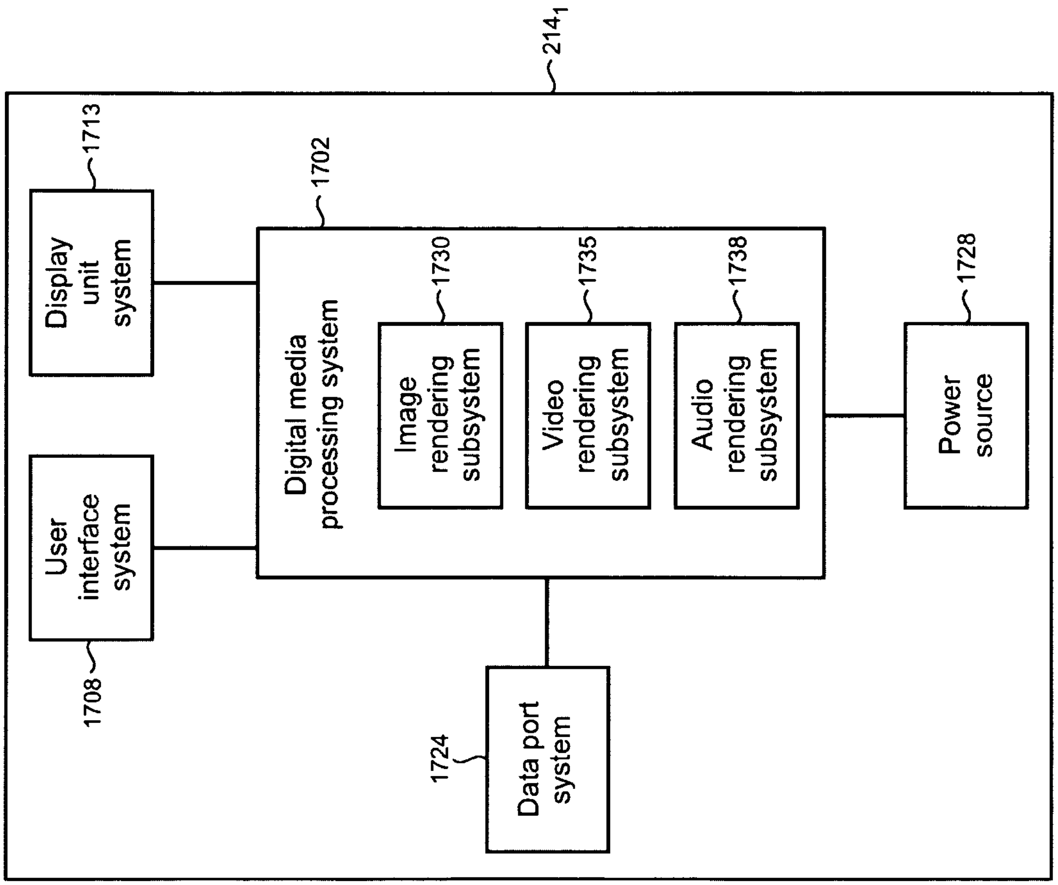
FIG. 17 is a simplified block diagram that shows various functional components of an illustrative example of a personal media player.

FIG. 17 a simplified block diagram that shows various illustrative functional components of the embeddable personal media player $214_1$. The functional components include a digital media processing system 1702, a user interface system 1708, a display unit system 1713, a power source system 1717, and a data port system 1724. The digital media processing system 1702 further comprises an image rendering subsystem 1730, a video rendering subsystem 1735, and an audio rendering subsystem 1738.

The digital media processing system 1702 is the central processing system for the personal media player $214_1$ and provides functionality that is similar to that provided by the processing systems found in a variety of electronic devices such as PCs, mobile phones, PDAs, handheld game devices, digital recording and playback systems, and the like.

Some of the primary functions of the digital media processing system 1702 may include receiving media content files downloaded to the player $214_1$, coordinating storage of such media content files, recalling specific media content files on demand, and rendering the media content files into audio/visual output on the display for the user 605. Additional features of the digital media processing system 1702 may also include searching external resources for media content files, coordinating DRM protocols for protected media content, and interfacing directly with other recording and playback systems.

As noted above the digital media processing system 1702 further comprises three subsystems: the video rendering subsystem 1735 which handles all functionality related to video-based media content files, which may include files in MPEG (Moving Picture Experts Group) and other formats; the audio rendering subsystem 1738 which handles all functionality related to audio-based media content including, for example music in the commonly-utilized MP3 format and other formats; and the image rendering subsystem 1730 which handles all functionality related to picture-based media content, including for example JPEG (Joint Photographic Experts Group), GIF (Graphic Interchange Format), and other formats. While each subsystem is shown as being logically separated, each may in fact share hardware and software components with each other and with the rest of the personal media player $214_1$, as may be necessary to meet the requirements of a particular implementation.

Functionally coupled to the digital media processing system 1702 is the user interface system 1708 through which the user 605 may exercise control over the operation of the personal media player $214_1$. A display unit system 1713 is also functionally coupled to the digital media processing system 1702 and may comprise the display screen 842 (FIG. 8). Audio output through the earphone jack 712 (FIG. 7) for playback of rendered media content may also be supported by display unit system 1713. The display unit system 1713 may also functionally support and complement the operation of the user interface system 1708 by providing visual and/or audio output to the user 105 during operation of the player 110.

The data port system 1724 is also functionally coupled to the digital media processing system 1702 and provides a mechanism by which the personal media player $214_1$ can interface with external systems in order to download media content. The data port system 1724 may comprise, for example, a data synchronization connector port, a network connection (which may be wired or wireless), or other means of connectivity.

The personal media player $214_1$ has a power source system 1717 that provides power to the entire device. The power source system 1717 in this example is coupled directly to the digital media processing system 1702 and indirectly to the other systems and subsystems throughout the player. The power source system 1717 may also be directly coupled to any other system or subsystem of the personal media player $214_1$. Typically, the power source may comprise a battery, a power converter/transformer, or any other conventional type of electricity-providing power source, portable or otherwise.

Figure 18:
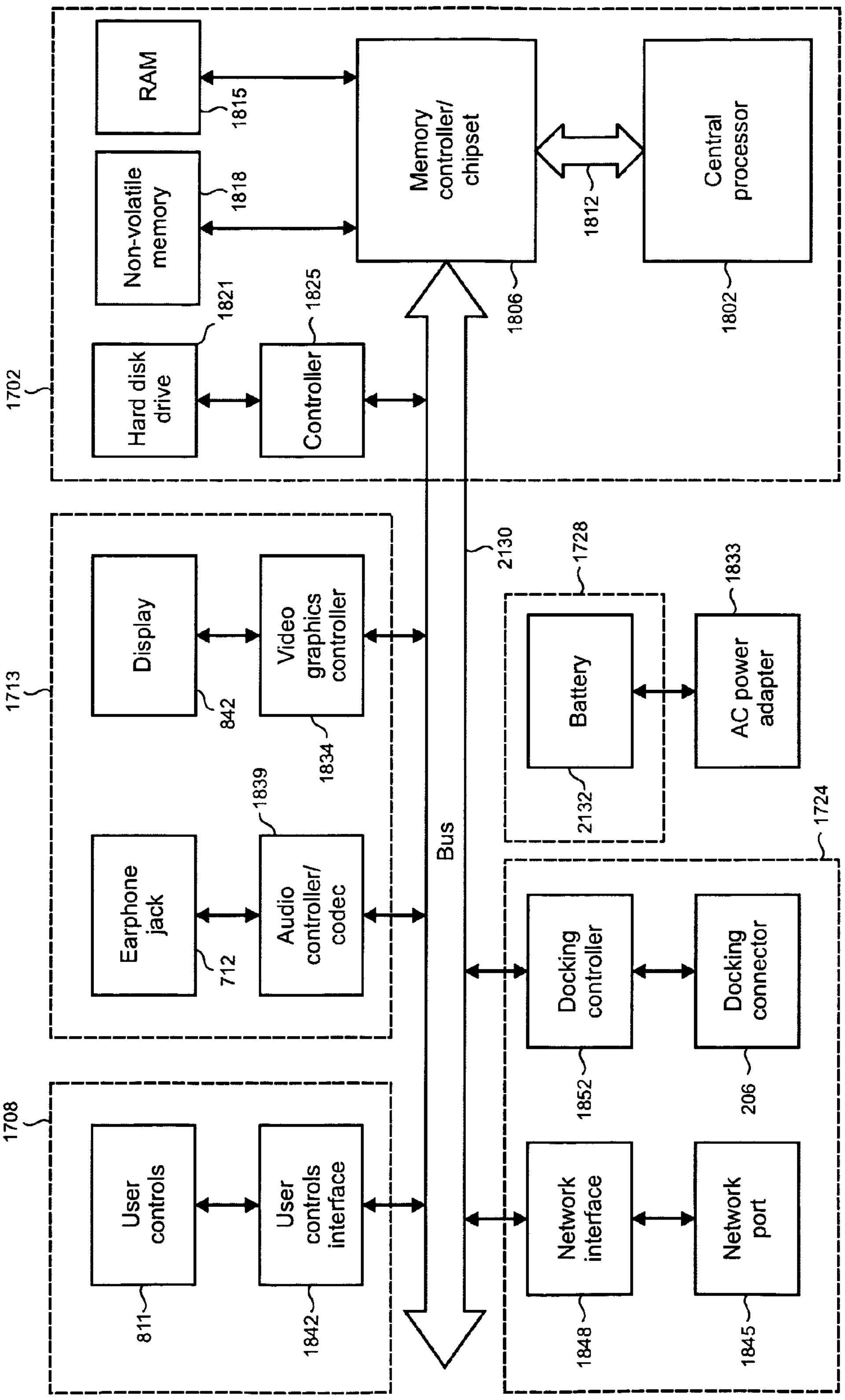
FIG. 18 is a simplified block diagram that shows various physical components of an illustrative example of a personal media player.

FIG. 18 is a simplified block diagram that shows various illustrative physical components of the personal media player $214_1$ based on the functional components shown in FIG. 17 and described in the accompanying text (which are represented in FIG. 18 by dashed lines) including the digital media processing system 1702, the user interface system 1708, the display unit system 1713, the data port system 1724, and the power source system 1728. While each physical component is shown as included in only a single functional component in FIG. 18 the physical components may, in fact, be shared by more than one functional component.

The physical components include a central processor 1802 coupled to a memory controller/chipset 1806 through, for example, a multi-pin connection 1812. The memory controller/chipset 1806 may be, in turn, coupled to random access memory ("RAM") 1815 and/or non-volatile memory 1818 such as Flash memory. These physical components, through connectivity with the memory controller/chipset 1806, may be collectively coupled to a hard disk drive 1821 via a controller 1825, as well as to the rest of the functional component systems via a system bus 1830.

In the power supply system 1728, a rechargeable battery 1832 may be used to provide power to the components using one or more connections (not shown). The battery 1832, in turn, may also be coupled to an external AC power adapter 1833 or receive power via the device connector 202 (FIG. 2) when the personal media player $214_1$ is embedded in the headphones 105.

The display screen 218 is associated with a video graphics controller 1834. The video graphics controller will typically use a mix of software, firmware, and/or hardware, as is known in the art, to implement the GUI 839 on the display screen 842. Along with the earphone jack 712 and its associated audio controller/codec 1839, these components comprise the display unit system 1713 and may be directly or indirectly connected to the other physical components via the system bus 2130.

The user controls 811 are associated with a user control interface 2142 in the user interface system 1708 that implements the user control functionality that is used to support the interaction with the GUI 839. A network port 2145 and associated network interface 2148, along with the docking connector 206 and its associated controller 2152 may constitute the physical components of the data port system 1724. These components may also directly or indirectly connect to the other components via the system bus 2130.

Figure 19:
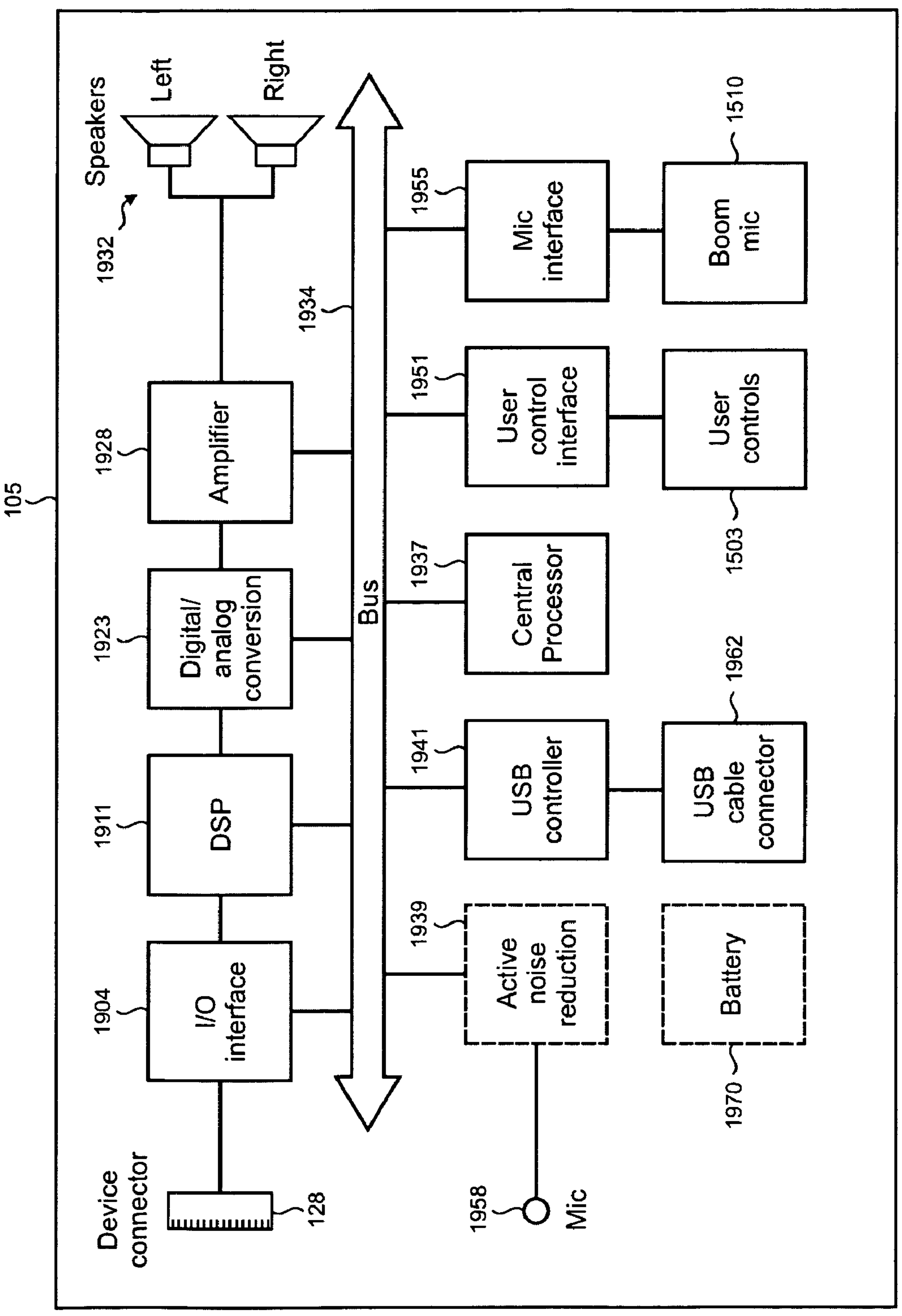
FIG. 19 is a simplified block diagram that shows various components used to implement the functionality provided by the present headphones with embeddable accessories.

FIG. 19 is a simplified block diagram that shows various components used to implement the functionality provided by the present headphones 105. While the components are shown in a single diagram, they may be physically distributed between the speaker enclosures 112. As noted above the device connector 128 is arranged to connect to an embeddable accessory 214. Signals from the accessory 214 that represent audio content are buffered in an input/output ("I/O") interface 1904 and then subjected to some processing in a digital signal processor ("DSP") 1911. From the DSP 1911, the digital signal is converted to an analog signal in a digital/analog converter 1923 before being amplified by an amplifier 1928 and then rendered by the speakers 1932. As noted above, audio content is commonly encoded as a stereophonic signal, thus the signals rendered by the speakers 1932 will differ as may be required to produce the stereo effect.

Control and other data signals received via the device connector 128 will be passed over a common communications bus 1934 to other components in the headphones 105 including a central processor 1937 which implements the functionality provided by the headphones 105. Other components coupled to the bus 1934 include an optionally implemented active noise reduction circuit 1939, a USB controller 1941, a user control interface 1951, and an optionally utilized microphone interface 1955.

The active noise reduction circuit 1939 senses noise in the environment outside the headphones 105 using a microphone 1958. It then produces an equal but opposite canceling signal that will be rendered by the speakers 1932. Noise can be reduced significantly which can enable the user 605 to enjoy audio content at a lower and safer volume level.

The USB controller 1941 interoperates with a USB cable connector 1962 through which the detachable communications cable 125 (FIG. 1) may interface. The user control interface 1951 interoperates with the user controls 1503 on the headphones. Similarly, the microphone interface 1955 is used to interface with the optionally implemented and detachable boom microphone 1510.

The device connector will pass power from a battery pack $214_2$ to the components shown in FIG. 19 when the battery pack is embedded in the headphones. In scenarios where a battery pack $214_2$ is not used, as noted above, a rechargeable battery or one or more conventional disposable batteries (representatively identified by reference numeral 1970) will be included in the headphones 105 and used to provide power to the various components (power connections not shown). When a rechargeable battery is used, it will typically be recharged via power received over the USB cable connector 1962 when the headphones 105 are connected, via the communications cable 125 (FIG. 1), to a powered USB port in a device such as a PC.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A headphone set adapted for use with interchangeable embeddable electronic accessories, comprising:

an enclosure, including an audio transducer, being adapted to place the audio transducer proximate to the user's ear when the headphone set is worn, and being configured with an accessory receiving space in which an accessory may be physically embedded;

a device connector configured for mateable engagement with a corresponding docking connector disposed in the accessory, the device and docking connectors being configured to be engaged by the physical embedding while the headphone set is being worn by the user to provide a signal path therethrough for coupling functionality provided by the accessory to the headphone set; and circuitry in the enclosure coupled to the device connector for receiving the functionality from the accessory so as to functionally embed the accessory in the headphone set.

2. The headphone set of claim 1 further including a second enclosure, including a second audio transducer, and being configured with a second accessory receiving space for holding a second accessory, the enclosures being coupled with a headband.

3. The headphone set of claim 1 further comprising a removably attachable boom microphone.

4. The headphone set of claim 1 in which the circuitry is further arranged to provide native functionality comprising at least one of active noise reduction, signal processing, or amplification.

5. The headphone set of claim 1 in which the accessory functionality comprises at least one of RF communication, battery power, or media content rendering, the media content comprising one of audio, video, or image.

6. The headphone set of claim 5 in which the media content is synchronized using the headphone set as a dock for the accessory.

7. The headphone set of claim 1 further comprising a wired communications interface for interfacing with a communications cable, the communications interface supporting signal communications between the headphone set and a remote electronic device.

8. The headphone set of claim 1 further comprising a retention mechanism for positively retaining the accessory within the receiving space when the accessory is physically embedded.

9. The headphone set of claim 1 in which the retention mechanism provides one of audible or tactile feedback when the accessory is physically embedded.

10. The headphone set of claim 1 further including one or more user controls for controlling functionality provided by the accessory.

11. The headphone set of claim 10 in which the user controls are configured with features to enable identification of the user controls by touch.

12. The headphone set of claim 1 in which the enclosure is one of over-the-ear, or on-ear design.

13. An accessory that is configured to be interchangeably coupled to a headphone set within an accessory receiving space disposed therein, comprising:

a body shaped for removable engagement with the accessory receiving space;

one or more components contained in the body for supplying at least one enhanced functionality, and a docking connector disposed in the body, a portion of which is exposed for mateable engagement while the headphone set is being worn by a user with a mating device connector that is disposed in the accessory receiving space of the headphone set, the connectors when coupled providing a signal path therethrough so that the enhanced functionality is embedded with functionality natively supported by the headphone set, the connectors being coupled when the body is engaged with the accessory receiving space.

14. The accessory of claim 13 in which the enhanced functionality comprises one of media player, RF wireless, mass storage, or battery functionality, or combination thereof.

15. The accessory of claim 13 further comprising markings to differentiate functionality provided therein, the markings including ones of icon, text, color coding, or combinations thereof.

16. The accessory of claim 13 further comprising a retention mechanism to retain the accessory within the accessory receiving space.

17. The accessory of claim 16 in which the retention mechanism operates to retain the accessory with a snap fit.

* * * * *